UNITED STATES PATENT OFFICE.

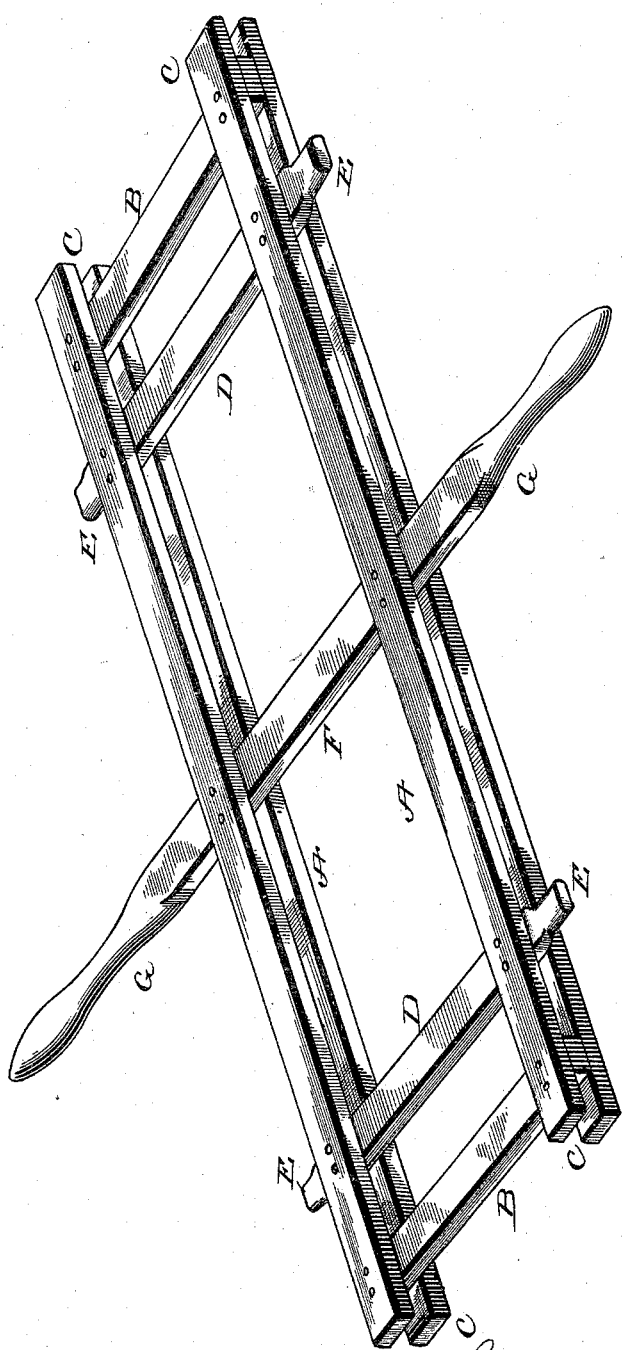

JONATHAN W. GIBBONS AND JAMES L. McDONALD, OF JACKSONVILLE, ILLINOIS.

REEL FOR FENCE-WIRE.

SPECIFICATION forming part of Letters Patent No. 579,056, dated March 16, 1897.

Application filed January 13, 1897. Serial No. 619,091. (No model.)

*To all whom it may concern:*

Be it known that we, JONATHAN W. GIBBONS and JAMES L. MCDONALD, citizens of the United States, residing at Jacksonville, in the county of Morgan and State of Illinois, have invented certain new and useful Improvements in Reels for Fence-Wire; and we do declare the following to be a full, clear, and exact description of the invention, such as will enable others skilled in the art to which it appertains to make and use the same, reference being had to the accompanying drawing, and to the letters of reference marked thereon, which forms a part of this specification.

Our invention is a reel for holding and coiling fence-wire while the same is being applied to or removed from a fence, and is intended more especially for use in changing wire from one fence to another.

It consists in a certain novel construction hereinafter described and claimed.

In the accompanying drawing we have shown a perspective view of a reel constructed in accordance with our invention.

In carrying out our invention we employ a pair of side bars A, each of which is composed of two similar members, as shown. Extending between these side bars, and secured between the members of the same, are the transverse bars B, which give the necessary rigidity to the device and support the wire. The ends of the side bars project beyond the transverse wire-supporting bars, as shown at C, so as to form guides and side stays for the wire while it is being reeled. At points between the wire-supporting bars B and the center of the side bars we secure the transverse bars or braces D, the ends of which are extended beyond the side bars and shaped into handles E. At the center of the device we provide the extended transverse bar F, having its ends formed into round handles G, so that when they are held by the operator the bar may serve as an axle, upon which the reel will turn.

In practice if it be desired to remove wire from a fence the end of the wire is fastened to the end of the reel in any convenient manner, as, for instance, by wrapping it around the wire-supporting bar. The operators, one on each side, then lightly grasp the axle-handles, so as to support the reel, and rotate the same by pushing on the outer handles, as will be readily understood. The same operation is performed to transfer wire to the reel from the spool on which it is received from the factory. In transferring wire from the reel to a fence the end of the wire is secured to a post, and the reel then carried along the line of the fence, the tension of the wire causing the reel to turn on its axle and the wire to unwind. Should the wire catch and bind, the turning may be facilitated by pushing on the outer handles.

The device is very simple and is easily manipulated.

Having thus described our invention, what we claim, and desire to secure by Letters Patent, is—

A reel for fence-wire consisting of side bars, wire-supporting cross-bars secured to the side bars near the ends of the same, handles on the side bars between the center of the same and the wire-supporting bars, and an axle secured to the side bars at the center thereof and extending beyond the same and formed into supporting-handles.

In testimony whereof we affix our signatures in presence of two witnesses.

JONATHAN W. GIBBONS.
    JAMES L. McDONALD.

Witnesses:
 CHARLES A. BARNES,
 L. C. ENGEL.